United States Patent
Morimoto

(10) Patent No.: US 6,476,713 B2
(45) Date of Patent: Nov. 5, 2002

(54) CONNECTING STRUCTURE FOR INDICATOR DISPLAY

(75) Inventor: Hatsuki Morimoto, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/800,569

(22) Filed: Mar. 8, 2001

(65) Prior Publication Data

US 2001/0020894 A1 Sep. 13, 2001

(30) Foreign Application Priority Data

Mar. 10, 2000 (JP) ........................................ 2000-066195

(51) Int. Cl.[7] .............................................. B60Q 1/00
(52) U.S. Cl. ..................................... 340/456; 200/61.88
(58) Field of Search ............................. 340/456, 686.1, 340/332, 815.4, 664, 531, 533, 537; 200/61.88; 74/473.3

(56) References Cited

U.S. PATENT DOCUMENTS

| | | | |
|---|---|---|---|
| 4,785,615 A | * 11/1988 | Leigh-Monstevens ... | 340/456 X |
| 4,882,572 A | * 11/1989 | Lippmann et al. ........ | 340/456 |
| 4,912,465 A | * 3/1990 | Greer .................. | 340/868.1 X |
| 5,197,344 A | * 3/1993 | Maier et al. .......... | 200/61.88 X |
| 5,561,416 A | * 10/1996 | Marshall et al. ....... | 340/456 |
| 5,696,483 A | * 12/1997 | Khalid et al. .......... | 340/456 |
| 5,973,593 A | * 10/1999 | Botella ................ | 340/456 |

FOREIGN PATENT DOCUMENTS

| | | |
|---|---|---|
| JP | 5-284564 | 10/1993 |
| JP | 7-210237 | 8/1995 |

OTHER PUBLICATIONS

English Language Abstract of JP 5–284564.
English Language Abstract of JP 7–210237.

* cited by examiner

*Primary Examiner*—Thomas Mullen
(74) *Attorney, Agent, or Firm*—Greenblum & Bernstein, P.L.C.

(57) ABSTRACT

A connecting structure for an indicator display is provided that utilizes only a single electric wire of a wire harness used in a circuit to display gear position. The circuit is designed so that the resistances of respective circuits corresponding to the gear positions in an inhibitor switch of the automatic transmission are made different. A judging circuit is provided to discriminate and judge electric current values in a gear indicator. A respective display lamp corresponding to the selected gear position is lighted, and the connection of the inhibitor switch with the gear indicator is carried out by a wire harness having a single electric wire.

4 Claims, 3 Drawing Sheets

CONNECTING STRUCTURE FOR INDICATOR DISPLAY

BACKGROUND OF THE INVENTION

1. Field of the Invention

The present invention relates to a connecting structure for an indicator display, and particularly, the number of electric wires forming a wire harness for connection is reduced to a single wire, by improving the inhibitor switches of an automatic transmission and a gear indicator.

2. Description of Background Information

Many automotive vehicles have an automatic transmission include a gear position indicator on a vehicle information display, which is provided with a speedometer, various kinds of warning lamps, and the like, for communicating the present gear position to a driver.

FIG. 2 schematically shows wiring for indicating the gear position of an automatic transmission in a vehicle. The automatic transmission 3 connected with an engine 2 installed in an engine compartment 1a of a vehicle 1 includes an inhibitor switch that judges a gear position. The inhibitor switch 4 provides a gear position signal and is connected by a wire harness W/H with a gear indicator 6 of a vehicle information display 5 which is provided in an instrument panel and the like.

FIG. 3 shows a conventional connection circuit for indicating the above-mentioned gear position. The automatic transmission 3 of the present conventional example has a total of six positions including parking P, reverse R. neutral N, drive D, a second speed fixation ②, and a first speed fixation ①. The inhibitor switch 4 constitutes an inner circuit by a first circuit to a sixth circuit 7a to 7f having contact points 4a to 4f for the respective positions at ends which correspond to the above-mentioned six positions, and has a contact piece 4g which is linked to the gear position of the automatic transmission 3.

The inhibitor switch 4 is connected by the wire harness W/H with the gear indicator 6 including the display lamps 6a to 6f which correspond to the respective positions of P, R, N, D, ② and ①. Since the wire harness W/H directly corresponds to and connects respectively the signal out-put parts 8a to 8f of six points, such as the first circuit to the sixth circuit 7a to 7f of the inhibitor switch 4, with the signal in-puts 9a to 9f of six connection points of the gear indicator 6, the wire harness is configured to have six electric wires d1 to d6 and also includes the connectors C1 to C4 for connection.

The display of the respective gear positions are described below.

When a power source of the vehicle 1 is turned on, the contact 4g of the inhibitor switch 4 is connected with the power source and closes the contact point corresponding with the gear position of the automatic transmission 3. The power source V then sends out a signal of the gear position through the wire harness W/H, and a corresponding display lamp is lighted.

In the wire harness W/H formed by the above-mentioned six electric wires d1 to d6, when one of the display lamps is lighted, only one of the electric wires is used for signal transmission, and the other electric wires are unused, which results in a surplus of wires from the standpoint of a circuit. Further, in order to prepare the wire harness W/H containing the six electric wires d1 to d6, the expenditure of six electric wires is thus required, as well as six terminals installed on each end of the electric wires. Further, the connectors C1 to C4, having a size sufficient to accommodate the six electric wires, are also required, and the wire harness W/H must be assembled with the six electric wires. Accordingly, the assembly is time consuming and requires a number of parts, and the result is that the assembly of the wire harness W/H is expensive. Further, when the number of electric wires become plural, the number of connection points and the like increase, and there is a concern that connection problems and the like will also increase corresponding to the number of electric wires.

Further, there conventionally exists a so-called multiple system unit which carries out various kinds of signals with one electric wire by respectively making the frequencies of transmission signals different. However, when the multiple system unit is applied to the display circuit of above-mentioned gear position, it is necessary that an expensive frequency converter is provided on the inhibitor switch at the signal out-put side, and a discriminator that discriminates the respective signals having different frequencies is provided on the gear indicator at the signal in-put side. Accordingly, a reduction of costs is not achieved, and an installation space for these devices must be provided.

SUMMARY OF THE INVENTION

The present invention was developed considering the above-mentioned problems, and an object is to reduce the number of electric wires used for the connection to a single wire. A further object is to reduce costs by respectively making the electric current value of signals output from the inhibitor switch different, without using a multiple system unit.

In order to solve the above-mentioned problems, the present invention provides a connecting structure for an indicator display connecting an inhibitor switch that outputs signals corresponding to respective gear positions connected by a wire harness with a gear indicator for indicating the gear positions by the input of the above-mentioned signals which is provided in a vehicle information display in a passenger compartment.

The connecting structure includes the output circuit of the inhibitor switch having a plurality of circuits with different resistance values for each respective gear position, and a signal output is formed by collecting the end of the output side of the plurality of circuits. A judgment circuit that discriminates and judges electric current values through a single signal input part is provided in the gear indicator.

The signal output of the inhibitor switch and the signal input of the gear indicator are connected with a wire harness, and the gear position is indicated by the gear indicator.

Thus, the electric current value of a signal output from the inhibitor switch can be made different by respectively making the resistance values of the respective circuits corresponding to the respective gear positions of the inhibitor switch different. Further, the signal output of the inhibitor switch and the signal input of the indicator become one position, respectively, by providing a judgment circuit that measures the electric current values of the signals and carries out the opening and closing of the circuits of respective display lamps in accordance with corresponding electric current values, and the electric wire that forms the connection can be a single electric wire.

Namely, even if the inhibitor switch and the gear indicator are connected by a wire harness W/H' constituted by a single electric wire and the signals of the gear positions are transmitted by that electric wire, the electric current values of the signals differ due to the difference resistance. Thus, the signals can be judged simply by judging the electric current. Further, the display lamp corresponding to the signal can be illuminated by carrying out the judgment of the electric current values by the judgment circuit provided in the indicator. Accordingly, the wire harness can be formed of only a single electric wire. Thus, the expense required for the wire harness can be reduced.

Further, since the difference of the resistance values of the respective circuits can be realized by only building the resistances having different resistance values in the respective circuits, it can be corresponded more easily and at a far lower cost, as compared with that of the frequencies of the respective signals that are made different as a multiple system unit. Further, as the signal input only judges the difference of the electric current values, various kind of signals can be positively discriminated without additional expense, as compared with signals judged by the difference of the frequencies of the multiple system unit.

BRIEF DESCRIPTION OF DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE INVENTION

The mode of operation of the present invention is described in detail below with reference to the drawings.

Figure 1:
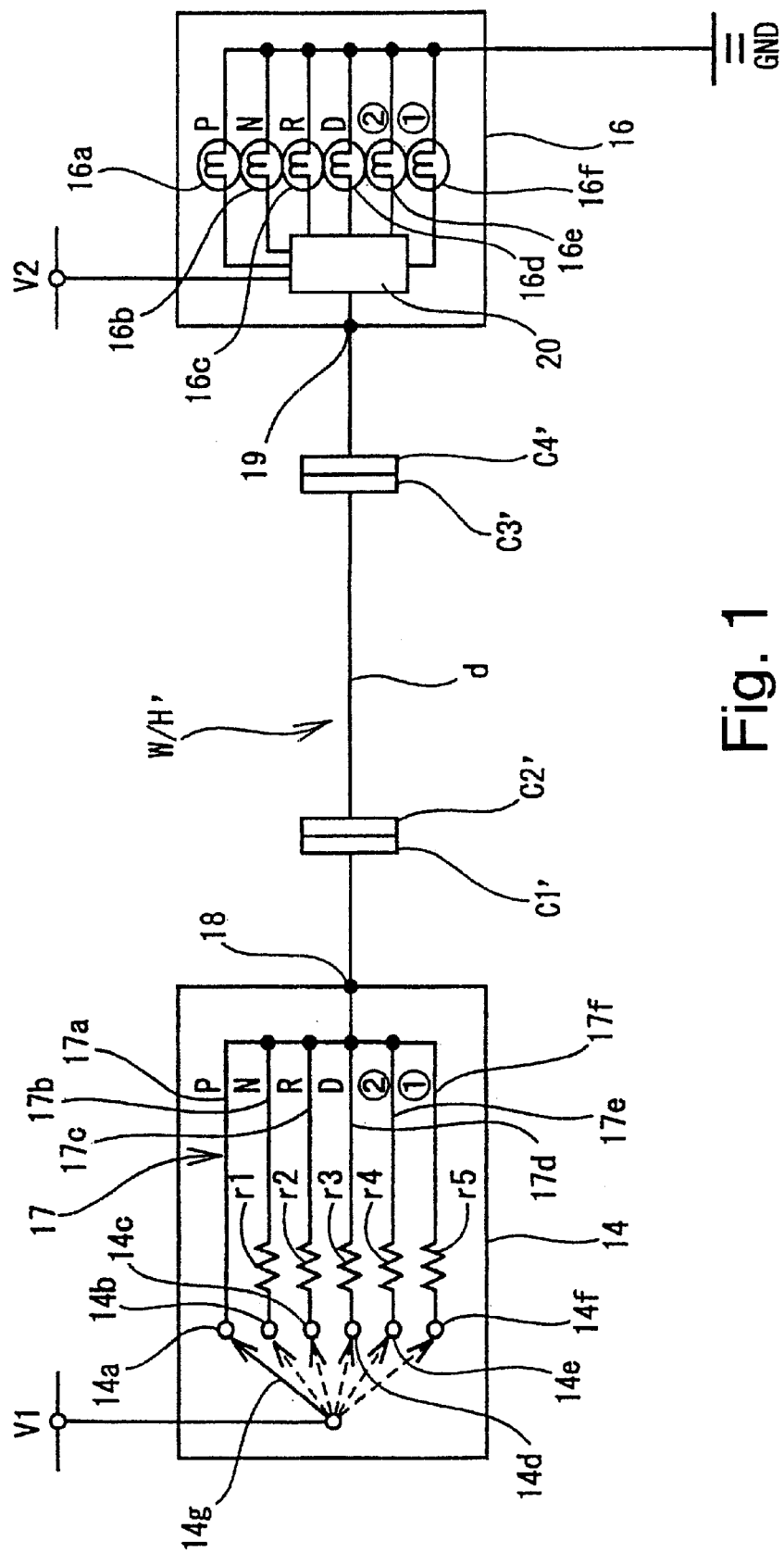
FIG. 1 is a circuit diagram of the connecting structure for the indicator display of the present invention.
Figure 2:
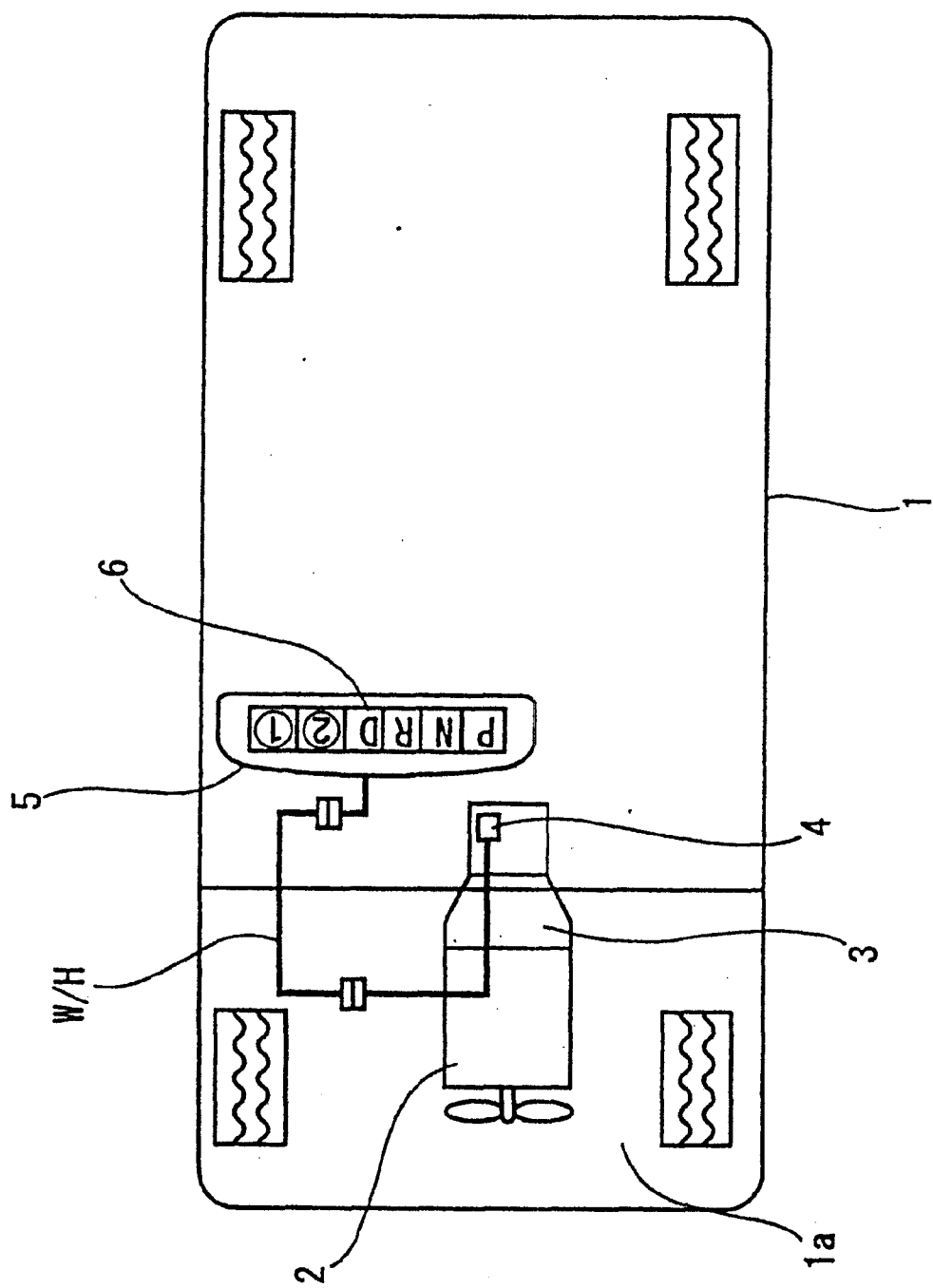
FIG. 2 is a schematic drawing of a circuit for gear position display in a vehicle.
Figure 3:
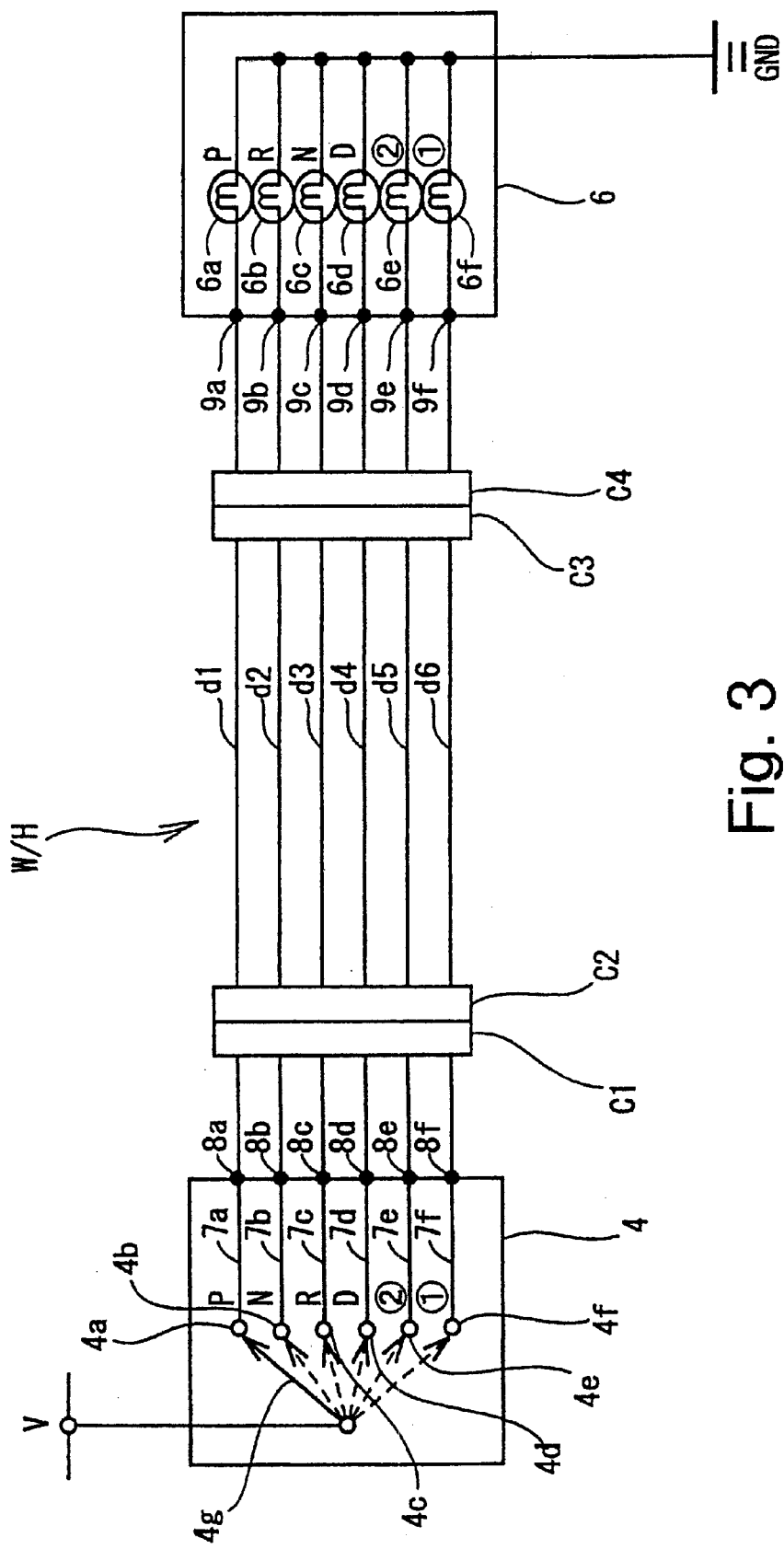
FIG. 3 is a circuit diagram of a conventional connecting structure for indicator display.

FIG. 1 shows a circuit of connection structure for indicating a gear position, and an inhibitor switch 14 is connected with a gear indicator 16 by a wire harness W/H'. The arrangement and wiring condition of the inhibitor switch 14, the gear indicator 16 and the wire harness W/H' in a vehicle are the same as the embodiment of FIG. 2. Namely, the inhibitor switch 14 is provided on the automatic transmission having the six positions of P, R, N, D, ② and ①, and the gear indicator 16 is provided in a vehicle information display provided with a speedometer, various warning lamps and the like, in a passenger compartment.

The inhibitor switch 14 provides an output circuit 17 inside, and the output circuit 17 has a connecting piece 14g linked with the gear position of the automatic transmission. The output circuit 17 includes a first circuit to a sixth circuit 17a to 17f which are formed by conductors having respective contact points 14a to 14f at one end which correspond to the respective gear positions for connecting to the connecting piece 14g. The internal resistance values of the first circuit to the sixth circuit 17a to 17f differ respectively by interposing the resistances r1 to r5, and one signal output 18 is formed by connecting the opposite ends of the conductors forming the first through sixth circuits on the output side.

The values of the resistances r1 to r5 are described below in the present mode of operation. The resistances r1, r2, r3, r4 and r5 have different resistance values, for example, of 0.1 Ω, 0.4 Ω, 0.6 Ω, 0.8 Ω and 1.0 Ω, respectively, and the internal resistances differ for each respective circuit. Thus, the resistance value of the first circuit 17a has a value of only the internal resistance of a conductor, and each of the respective resistance values from the second circuit 17b to the sixth circuit 17f has a value obtained by adding the resistance value of each of the respective resistances r1 to r5 to the internal resistance of the respective conductor.

Since the voltage V1 supplied to the above-mentioned output circuit 17 is constant, the electric current value which is output from the signal output 18 of the inhibitor switch 14 differs according to the respective circuit traveled (from the first circuit 17a to the sixth circuit 17f).

For example, when the gear of the automatic transmission is positioned at the parking position P, the connecting piece 14g is connected with the contact point 14a, and the gear position signal passes through the first circuit 17a and is output as an electric current value subject only to the influence of the internal resistance. Further, when the gear is positioned at the neutral position N, the contact point 14a is connected with the contact point 14b and the gear position signal passes through the first circuit 17b. Thus, the electric current value which is output is influenced by the resistance r1. Likewise, for the circuits 17c–17e, the circuit path for a signal differs according to the gear position, and the electric current value which is output from the inhibitor switch 14 will have six different values differing according to the gear positions and the respective circuit corresponding thereto.

On the other hand, the gear indicator 16 includes the display lamps 16a to 16f corresponding to the respective six positions of P, R, N, D, ② and ①, and also includes a signal judging circuit 20 connected to a signal input 19. The judging circuit 20 discriminates to judge the electric current value of the input signal, and the power source for lighting lamps V2 is designed to be connected to the display lamps 16a to 16f in accordance with the values determined by the judging circuit 20.

The above-mentioned discrimination and judgment are carried out in accordance with the electric current value of the gear position. Namely, since each electric current value which is output through the respective circuits 17a to 17f of the inhibitor switch 14 is preliminarily known according to the voltage V1 and the respective resistances r1 to r5, the power of the corresponding display lamps 16a to 16f based on these electric current values is designed to be separately supplied.

The connection of the above-mentioned inhibitor switch 14 and gear indicator 16 is carried out by the wire harness W/H' which is formed by only a single electric wire d. As described above, since the inhibitor switch 14 has one signal output 18 and the gear indicator 16 has one signal input 19, it is not necessary to have the same number of electric wires as the number of signals, and different kind of signals are designed to be transmitted by the same electric wire.

Further, the connectors C1' to C4' included in the above-mentioned wire harness W/H' have a small size corresponding to the single electric wire d.

Furthermore, the present invention is not limited to the above-mentioned mode of operation, and even though the number of the gear position increases or decreases, the wire harness constituted by the single electric wire can be similarly connected by making the resistance values of the respective circuits of the inhibitor switch different in a similar manner as described above. Further, in order to make the resistance values different, it is sufficient to make the electric current values which run in the respective circuits different, by combining the resistances having different resistance values in all of the respective circuits. Further, the present invention can be also applied to lighting the display lamps of different kinds of instruments and the like.

As is apparent from the above-mentioned description, when the connecting structure for indicator display of the present invention is used, the wire harness used for connecting an inhibitor switch with a gear indicator can be formed by a single electric wire, and costs related to the wire harness can be reduced. Further, since the number of the connecting points of the electric wires is reduced due to the reduction in the number of circuits, concerns about various problems such as poor contact and the like are reduced, and the reliability of the circuit can be improved.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. JP 2000-066195, filed on Mar. 10, 2000, which is herein expressly incorporated by reference in its entirety.

What is claimed is:

1. A connecting structure for an indicator display, in which a wire harness connects an inhibitor switch which outputs signals corresponding to respective gear positions provided on an automatic transmission with a gear indicator which indicates a gear position in accordance with the input of the above-mentioned signals provided in a vehicle information display in a passenger compartment, said connecting structure comprising:

an output circuit of said inhibitor switch including a plurality of circuits having resistance values different from each other for each respective gear position, said output circuit forming a signal output by combining the output side of said plurality of circuits;

a judgment circuit provided to said gear indicator that discriminates and judges different electric current values through one signal input; and a wire harness that connects said signal output of said inhibitor switch and said signal input of said gear indicator, thereby actuating the gear indicator.

2. The connecting structure according to claim 1, wherein said wire harness consists of a single electric wire.

3. A connecting structure for an indicator display of an automatic transmission, said connecting structure comprising:

an inhibitor switch including a connecting piece and an output circuit, said output circuit comprising a plurality of circuits having resistance values different from each other, each resistance value assigned to a respective gear position of the automatic transmission, said output circuit forming a signal output by connecting an output of each of said plurality of circuits together, wherein said signal output transmits signals corresponding to respective gear positions provided on the automatic transmission;

a gear indicator that receives the transmitted signals to indicate a gear position in a vehicle information display, said gear indicator including a judgment circuit that discriminates and judges different electric current values provided by the different resistance values through one signal input; and a wire harness that connects said signal output of said inhibitor switch and said signal input of said gear indicator, thereby permitting actuation of the gear indicator.

4. The connecting structure according to claim 3, wherein said wire harness consists of a single electric wire.

* * * * *